US012570229B2

(12) United States Patent
Deutsch et al.

(10) Patent No.: US 12,570,229 B2
(45) Date of Patent: Mar. 10, 2026

(54) ELECTRICAL POWER DISTRIBUTION SYSTEM WITH SELECTIVELY CONNECTABLE CHARGE STORAGE MEDIUM

(71) Applicant: Aptiv Technologies AG, Schaffhausen (CH)

(72) Inventors: Robert Deutsch, Shelby Township, MI (US); Stephen Moore, Fishers, IN (US); Mary Patterson, Carmel, IN (US); Hendrik Poth, Cologne (DE); Tim Puetz, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/807,204

(22) Filed: Aug. 16, 2024

(65) Prior Publication Data

US 2026/0048710 A1 Feb. 19, 2026

(51) Int. Cl.
| | |
|---|---|
| *H02J 7/34* | (2006.01) |
| *B60L 3/00* | (2019.01) |
| *B60L 58/20* | (2019.01) |
| *B60R 16/033* | (2006.01) |
| *H02J 1/10* | (2006.01) |
| *H02J 7/00* | (2006.01) |
| *H02J 9/06* | (2006.01) |

(52) U.S. Cl.
CPC .......... *B60R 16/033* (2013.01); *B60L 3/0046* (2013.01); *B60L 3/0092* (2013.01); *B60L 58/20* (2019.02); *H02J 1/10* (2013.01); *H02J 7/0048* (2020.01); *H02J 9/061* (2013.01);

*B60L 2210/12* (2013.01); *B60L 2210/14* (2013.01); *H02J 2207/20* (2020.01); *H02J 2207/50* (2020.01)

(58) Field of Classification Search
CPC ...... B60L 58/20; B60L 3/0046; B60L 3/0092; B60L 2210/12; B60L 2210/14; B60R 16/03; B60R 16/033; H02J 1/10; H02J 1/082

See application file for complete search history.

(56) References Cited

U.S. PATENT DOCUMENTS

| | | | | |
|---|---|---|---|---|
| 2020/0119548 A1* | 4/2020 | Haugan | ..................... | H02J 1/10 |
| 2020/0140101 A1* | 5/2020 | Long | ..................... | B64D 27/33 |
| 2021/0336467 A1* | 10/2021 | Hatano | ................. | H02J 7/0048 |
| 2023/0095408 A1* | 3/2023 | Takamatsu | .......... | H02M 3/1582 307/20 |
| 2024/0170997 A1 | 5/2024 | Deutsch et al. | | |
| 2024/0170998 A1 | 5/2024 | Deutsch et al. | | |
| 2024/0171061 A1 | 5/2024 | Deutsch | | |
| 2024/0171076 A1 | 5/2024 | Deutsch | | |

FOREIGN PATENT DOCUMENTS

| | | | | |
|---|---|---|---|---|
| CN | 116505617 A | * | 7/2023 | .......... H02J 7/00712 |

\* cited by examiner

*Primary Examiner* — Ryan Johnson
(74) *Attorney, Agent, or Firm* — Billion & Armitage

(57) ABSTRACT

Disclosed is a system for supplying and receiving electrical power from multiple electrical power buses. The system includes an electrical charge storage medium, a first switch connecting the storage medium to a first power bus, and a second switch connecting the storage medium to a second power bus. These switches are electronically controlled by a controller to manage power flow between the storage medium and the power buses.

18 Claims, 5 Drawing Sheets

ELECTRICAL POWER DISTRIBUTION SYSTEM WITH SELECTIVELY CONNECTABLE CHARGE STORAGE MEDIUM

TECHNICAL FIELD

The subject matter disclosed herein relates to electrical power supplies and, in particular, to back-up electrical power supplied configured to provide electrical power to multiple electrical power busses.

BACKGROUND

Electrical charge storage media, such as ultracapacitors, have been used to provide short-term high-power energy over wide temperature and use case conditions, for example in automotive applications. A traditional automotive electrical power bus is based on a nominal 12V system, but emerging automotive electrical architectures supplement the 12V system with a second separate 48V electrical power bus. The higher voltage power bus proportionally decreases current for the same power, thereby allowing a smaller required cross section for electrical conductors or wires, connectors, and power electronics.

Existing systems for supplying and receiving electrical power from multiple electrical power buses typically involve complex arrangements of switches and controllers to manage the flow of power between the electrical charge storage medium and the various buses. These systems often require separate control mechanisms for each switch, leading to increased complexity and potential points of failure. Additionally, the coordination of multiple switches to ensure efficient power distribution can be challenging, especially in dynamic operating conditions where power demands may vary rapidly.

In some conventional systems, the electrical charge storage medium is connected to a single power bus, limiting the flexibility and redundancy of the system. This configuration may result in inefficiencies and potential power disruptions if the connected power bus experiences a fault or overload. Furthermore, the lack of communication between the switches and the controller in these systems can hinder real-time monitoring and adjustment of power distribution, potentially leading to suboptimal performance and reduced reliability.

Efforts have been made to improve the reliability and efficiency of power supply systems by incorporating electronic controllers to manage the operation of switches. However, these approaches often focus on individual switches rather than considering the system as a whole, leading to suboptimal coordination and utilization of the electrical charge storage medium across multiple power buses. Moreover, the complexity of existing systems may limit scalability and adaptability to different power distribution requirements. However, none of these approaches have provided a comprehensive solution that combines the features described in this disclosure.

SUMMARY

In some aspects, the techniques described herein relate to a system configured to supply to a plurality of electrical power buses and receive electrical power from the plurality of electrical power buses, the system including: an electrical charge storage medium; a first switch configured to selectively connect the electrical charge storage medium to a first electrical power bus of the plurality of electrical power buses; and a second switch configured to selectively connect the electrical charge storage medium to a second electrical power bus of the plurality of electrical power buses distinct from the first electrical power bus, the first and second switches configured to be in electronic communication with an electronic controller configured to control operation of the first and second switches.

In some aspects, the techniques described herein relate to an electronic controller configured to control a system having an electrical charge storage medium interconnected with a boost/buck converter, a first switch configured to selectively connect the electrical charge storage medium to a first electrical power bus, and a second switch configured to selectively connect the boost/buck converter to a second electrical power bus distinct from the first electrical power bus, the electronic controller including: a computer readable medium storing instructions that, when executed by the electronic controller, cause the electronic controller to: turn off the first switch, turn on the second switch, and operate the boost/buck converter to provide electrical power from the second electrical power bus to the electrical charge storage medium.

DETAILED DESCRIPTION

Figure 1:
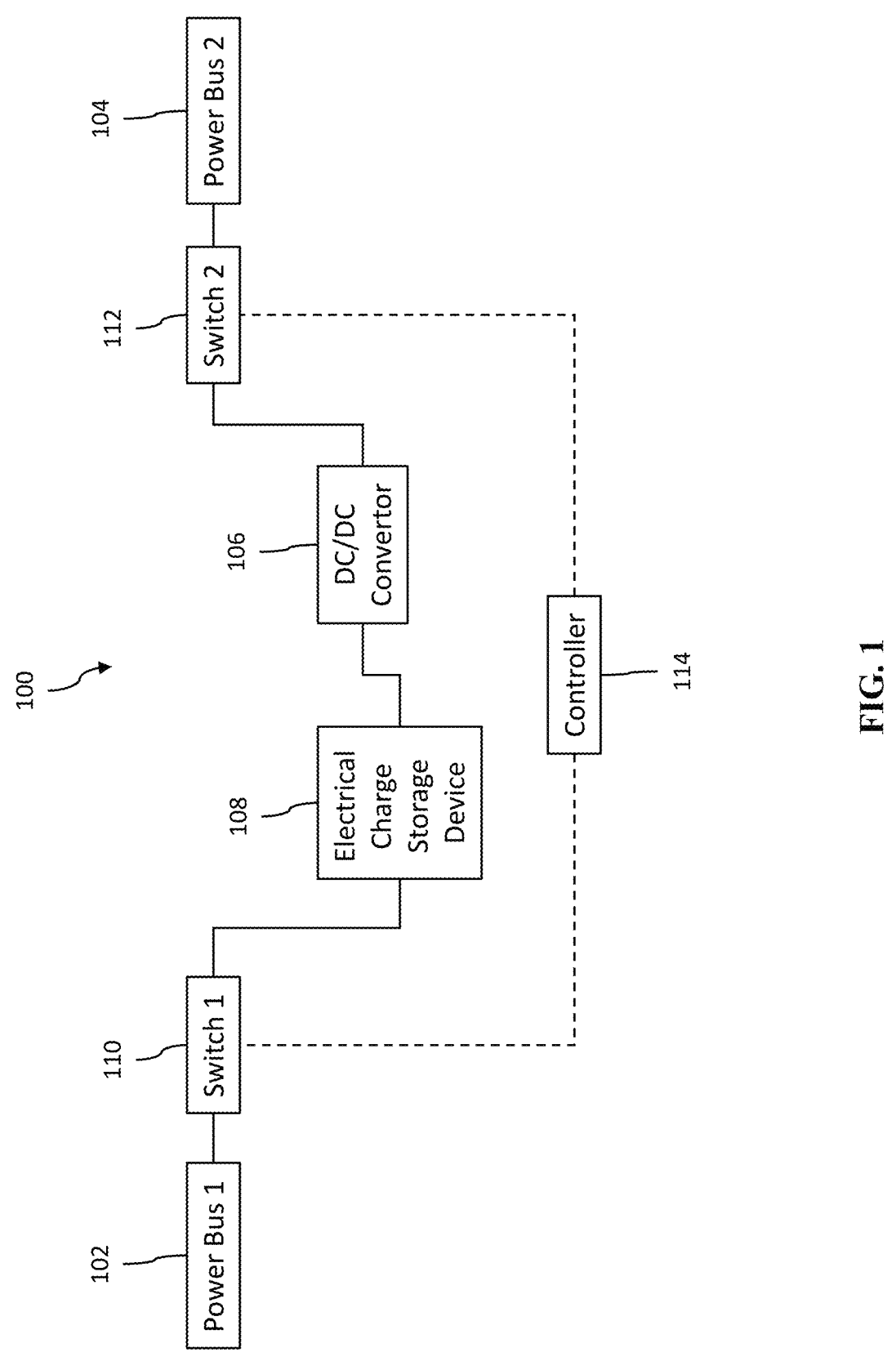
FIG. 1 is a schematic block diagram of an electrical power supply configured to supply back-up power to multiple electrical power buses according to some embodiments.

FIG. 1 shows a nonlimiting example of a system 100 that is configured to supply and receive electrical power from a first electrical power bus 102 and configured to supply and receive electrical power from a separate second electrical power bus 104. The system 100 includes a direct current-to-direct current (DC/DC) converter 106, an electrical charge storage medium 108 connected to the DC/DC converter, a first switch 110 configured to selectively connect the electrical charge storage medium 108 to the first electrical power bus 102, and a second switch 112 configured to selectively connect the DC/DC converter 106 to the second electrical power bus 104 which is separate and distinct from the first electrical power bus 102. The first and second switches 110, 112 are configured to be in electronic communication with an electronic controller 114 that is configured to control operation of the first and second switches 110, 112. The electronic communication path between the electronic controller 114 and the first and second switches 110, 112 is shown in FIG. 1 as a dashed line. The electronic controller 114 may be integral to the system 100 or may be separate or remote. The electrical charge storage medium 108 may be an ultracapacitor, hybrid supercapacitor, or high charge rate battery. The first electrical power bus 102 may operate at a nominal voltage that is the same as the second electrical power bus 104 or it may operate at a nominal voltage that is higher or lower than the second electrical power bus 104.

Figure 2:
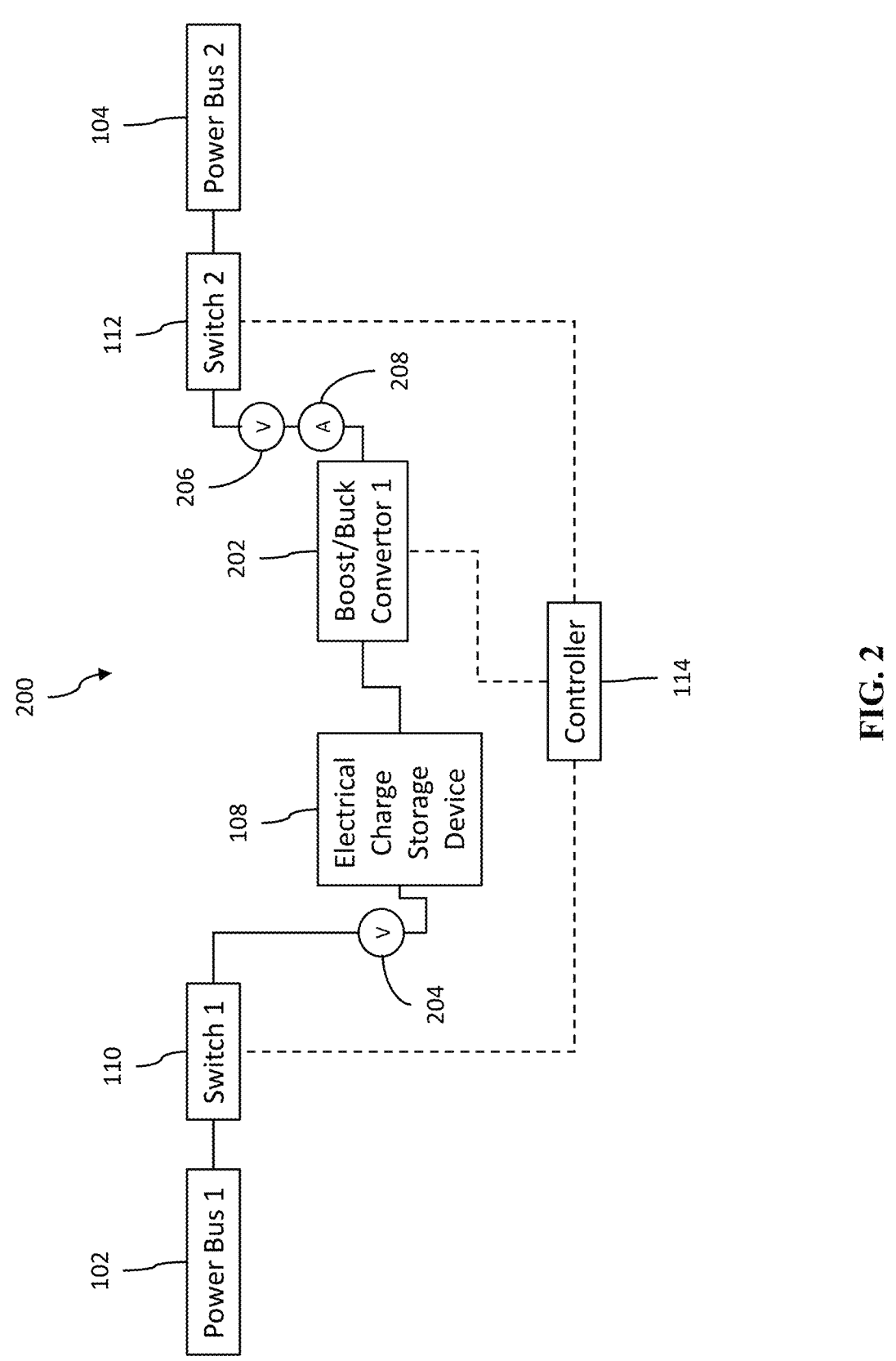
FIG. 2 is a schematic block diagram of another electrical power supply including a boost/buck converter configured to supply back-up power to multiple electrical power buses according to some embodiments.

FIG. 2 shows an embodiment of another system 200 containing all of the elements of the system 200 but in which the DC/DC converter is a boost/buck converter 202 that is in electronic communication with and controlled by the electronic controller. The electronic communication path between the electronic controller 114 and the boost/buck converter 202 is shown in FIG. 2 as a dashed line.

The electronic controller 114 includes a non-volatile computer readable medium. The medium stores instructions that, when executed by the electronic controller, cause the electronic controller to control the first and second switches and the boost/buck converter.

In a start-up phase of the operation of the system 200, the electrical charge storage medium 108 may be at a low state of charge. If connected directly to the first electrical power bus 102 it may generate an in rush current that could damage the electrical charge storage medium 108 and/or electrical components connected to the first electrical power bus 102. The computer readable medium may include instructions to charge the electrical charge storage medium 108 by causing the electronic controller 114 to turn off the first switch 110 to disconnect the electrical charge storage medium 108 from the first electrical power bus 102 and turn on the second switch 112 to connect the electrical charge storage medium 108 to the second electrical power bus 104 through the boost/buck converter 202. In the case where the nominal operating voltage of the second electrical power bus 104 is higher than the nominal operating voltage of the first power bus 102, the electronic controller 114 will operate the boost/buck converter 202 in buck mode to provide electrical power from the second electrical power bus 104 to the electrical charge storage medium 108. In the case where the nominal operating voltage of the second electrical power bus 104 is lower than the nominal operating voltage of the first power bus 102, the electronic controller 114 will operate the boost/buck converter 202 in boost mode to provide electrical power from the second electrical power bus 104 to the electrical charge storage medium 108. Once the electrical charge storage medium 108 achieves a predetermined voltage which will no longer cause an in rush current, the electronic controller 114 may turn on the first switch 110 to connect the electrical charge storage medium 108 to the first electrical power bus 102.

During this start-up phase, the electronic controller 114 may also perform an energy self-test of the system 200 by determining a storage capacity of the electrical charge storage medium 108. The electronic controller 114 determines an initial voltage of the electrical charge storage medium 108 from a voltage sensor 204 configured to determine a voltage of the electrical charge storage medium 108 after turning off the first switch 110 and before turning on the second switch 112 during the start-up phase described above. The electronic controller 114 then determines a value of the electrical power delivered to the electrical charge storage medium by the boost/buck converter from a voltage sensor 206 configured to determine a voltage of the boost/buck converter 202 and a current sensor 208 configured to determine a current through the boost/buck converter 202. Subsequently, the electronic controller 114 determines the storage capacity of the electrical charge storage medium 108 based on the value of the electrical power delivered to the electrical charge storage medium 108 by the boost/buck converter 202, a time period during which the electrical power delivered to the electrical charge storage medium 108 by the boost/buck converter 202, and a voltage difference between the initial voltage and a predetermined voltage.

Further, the electronic controller 114 may also perform power self-test of the system. The electronic controller 114 causes a power pulse to be generated from the boost/buck converter 202 to the electrical charge storage medium 108 during the start-up phase. This pulse generation may occur at the beginning, during or at the end of the start-up phase. The electronic controller 114 then determines an impedance of the electrical charge storage medium 108 based on a change in value of voltage sensor 204 in response to the power pulse.

The system 200 may also provide an electrical power bridge between the first and second electrical power buses 102, 104. Since the electrical charge storage medium 108 is directly-coupled to the first electrical power bus 102, it naturally gives and takes electrical energy according to voltage fluctuations on the first electrical power bus 102. The electronic controller 114 may monitor the voltage of the second electrical power bus 104 via the voltage sensor 206. If the voltage of the second electrical power bus 104 goes outside of its expected operational limits, the electronic controller 114 may operate the boost/buck converter 202 to either support or suppress the voltage on the second electrical power bus 104. In this case the electronic controller 114 may turn on the first switch 110, turn on the second switch 112, and operate the boost/buck converter 202 in boost mode to provide electrical power from the first electrical power bus 102 to the second electrical power bus 104 or operate the boost/buck converter 202 in boost mode to provide electrical power from the second electrical power bus 104 to the first electrical power bus 102 to maintain each of the first and second electrical power busses 102, 104 at their nominal voltage.

If the voltage of the first electrical power bus 102 drops below its nominal voltage when the voltage of the second electrical power bus 104 is operating below its nominal voltage, the electronic controller 114 may turn off the first switch 110 while keeping the second switch 112 on and operate the boost/buck converter 202 in boost mode to provide electrical power from the electrical charge storage medium 108 to the second electrical power bus 104 as long as the electrical charge storage medium 108 has sufficient charge to do so.

If the voltage of the second electrical power bus 104 drops below its nominal voltage when the voltage of the first electrical power bus 102 is operating below its nominal voltage, the electronic controller 114 may turn off the second switch 112 while keeping the first switch 110 on to provide electrical power from the electrical charge storage medium 108 to the first electrical power bus 102 as long as the electrical charge storage medium 108 has sufficient charge to do so.

If the voltage of the first electrical power bus 102 is above its nominal voltage while the voltage of the second electrical power bus 104 is operating at its nominal voltage, the electronic controller 114 may operate the boost/buck converter 202 in boost mode to provide as much electrical power from first electrical power bus 102 to the second electrical power bus 104 as the second electrical power bus 104 can accept in order to reduce voltage of the first electrical power bus 102. If the second electrical power bus 104 cannot accept power from the first electrical power bus 102, the electronic controller 114 may turn of the second switch 112, isolating the second electrical power bus 104 from the first electrical power bus 102 and provide as much electrical power from first electrical power bus 102 to the electrical charge storage medium 108 as the electrical charge storage medium 108 can accept to reduce voltage on the first electrical power bus 102. Once the electrical charge storage medium 108 reaches its full capacity the electronic controller 114 may turn off the first switch 110 to protect the electrical charge storage medium 108 from overvoltage damage.

If the voltage of the second electrical power bus 104 is above its nominal voltage while the voltage of first electrical power bus 102 is at its nominal voltage, the electronic controller 114 may operate the boost/buck converter 202 in buck mode to provide as much electrical power from second electrical power bus 104 to the first electrical power bus 104 as the first electrical power bus 102 can accept in order to reduce voltage on the second electrical power bus 104. If the first electrical power bus 102 cannot accept power from the second electrical power bus 104, the electronic controller 114 may turn of the first switch 110, isolating the first electrical power bus 102 from the second electrical power bus 104 and operate the boost/buck converter 202 in buck mode to provide as much electrical power from second electrical power bus 104 to the electrical charge storage medium 108 as the electrical charge storage medium 108 can accept to reduce voltage on the second electrical power bus 104. Once the electrical charge storage medium 108 reaches its full capacity, the electronic controller 114 may turn off the second switch 112 to protect the electrical charge storage medium 108 from overvoltage damage.

If there is abnormal condition of the first or second electrical power bus 102, 104, e.g., a short circuit, the electronic controller 114 may turn off the first or second switches 110, 112 to isolate the electrical power bus having the failure from the system 200.

If there is a low voltage condition simultaneously on the first and second electrical power busses 102, 104, the electronic controller 114 may allocate the electrical energy to the first and second electrical power busses 102, 104 by alternately stitching the first and second switches 110, 112 on and off.

Figure 3:
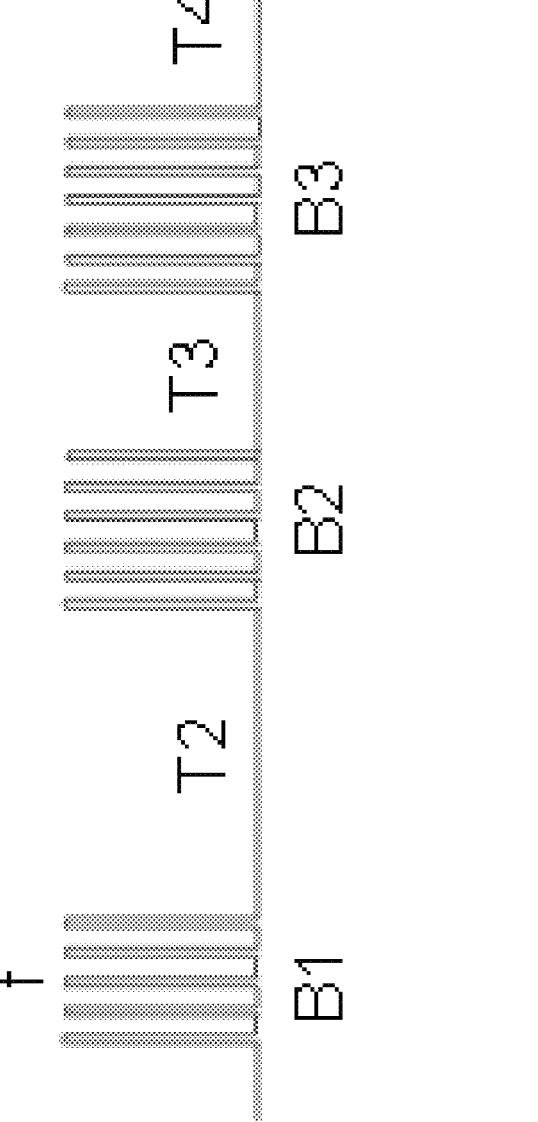
FIG. 3 is a diagram of a pulse width modulated output of a switch used when charging an electrical charge storage device according to some embodiments.

Since the system 200 does not have a dedicated DC/DC convertor between the electrical charge storage medium 108 and the first electrical power bus 102, the electrical charge storage medium 108 may be charged from the first electrical power bus 102 by operating the first switch 110 in a "burst mode" taking advantage of circuit inductance on first electrical power bus 102. This circuit inductance is much smaller than the inductance of a typical DC/DC convertor so the rise and fall times will be much smaller which could cause the first switch 110 to overheat. In order to counteract this heating of the first switch 110, the electronic controller 114 of system 200 may also be configured to charge the electrical charge storage medium 108 from the first electrical power bus 102 by operating the first switch 110 in the "burst mode" in which the first switch is switched at high frequency and low duty cycle B1 to pulse width modulate to electrical power from the first electrical power bus 102 to the electrical charge storage medium 108 as shown in FIG. 3. After a time period T1, the first switch is switched at the high frequency and a higher duty cycle B2. As the voltage of the electrical charge storage medium 108 rises, the switching losses diminish the times T2 and T3 between "bursts" may be decreased and the duty cycle of the burst B3 may be further increased. This burst mode may be employed when the second electrical power bus 104 has failed and the state of charge of the electrical charge storage medium 108 is low.

The system 100 may also employ this "burst mode" operation of the first switch 110 to charge the electrical charge storage medium 108 from the first electrical power bus 102.

Figure 4:
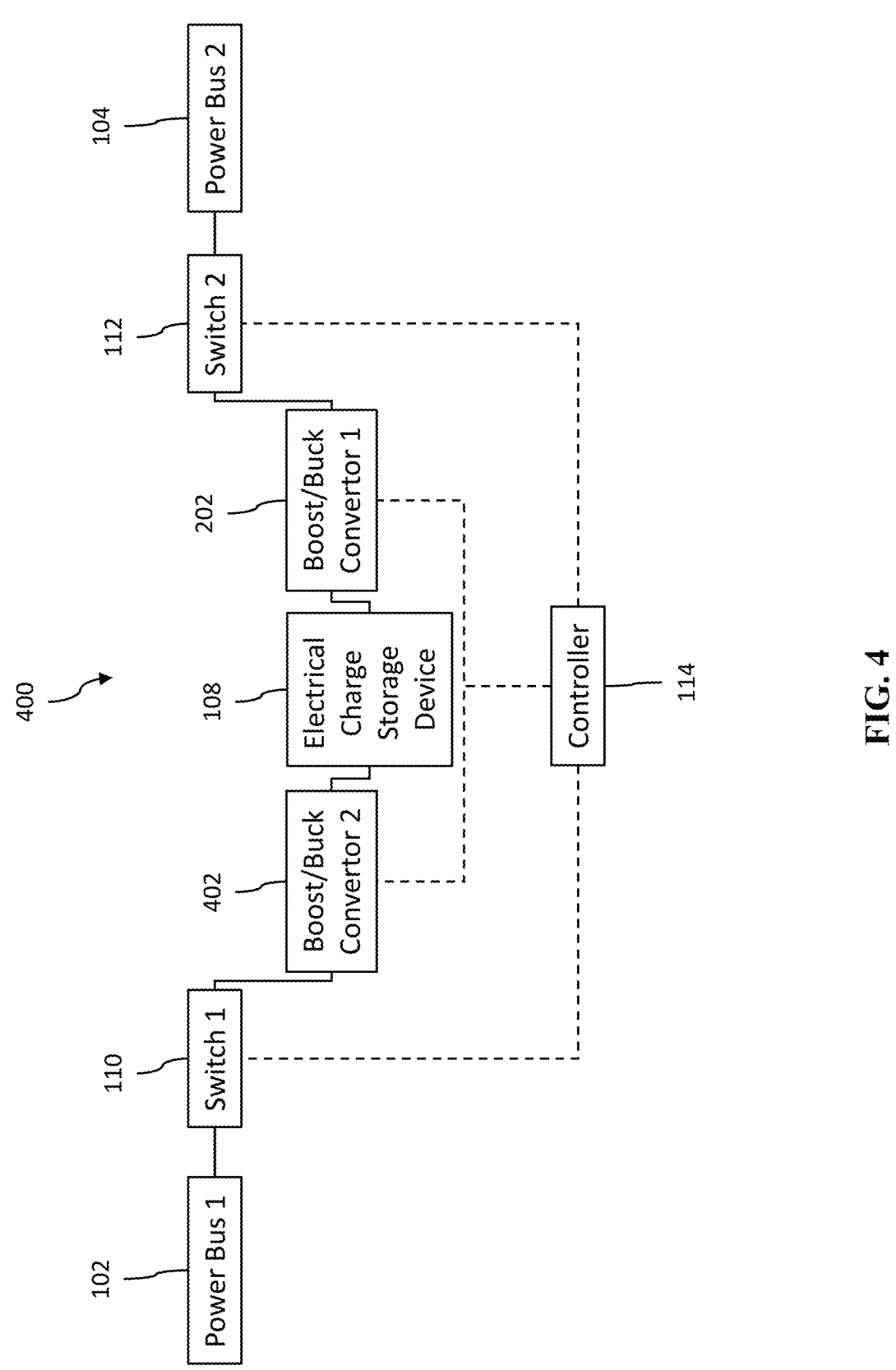
FIG. 4 is a schematic block diagram of another electrical power supply including two boost/buck converters configured to supply back-up power to multiple electrical power buses according to some embodiments.

FIG. 4 shows an embodiment of a system 400 which has two boost/buck converters, the first two boost/buck converter 202 and second boost/buck converter 402, that are in electronic communication with and controlled by the electronic controller 114. The electronic communication path between the second boost/buck converter 402 and the electronic controller 114 is shown in FIG. 4 as a dashed line. The second boost/buck converter 402 is connected between the first switch 110 and the electrical energy storage medium 108.

In this system 400, the electrical energy storage medium can operate at an arbitrary nominal voltage.

The system 400 allows the electrical energy storage medium 108 to receive and deliver energy from either the first electrical power bus 102 or the second electrical power bus 104. It can also shuttle energy between the first and second electrical power busses 102, 104.

If the electrical energy storage medium 108 is an ultracapacitor stack, the efficiency of the system 400 can be adjusted by changing the number of series connected ultracapacitor cells in the ultracapacitor stack. Choosing an ultracapacitor stack voltage that is closer to the most-used electrical power bus voltage will increase efficiency (this is because the DC/DC converter ratio will be closer to 1). Because ultracapacitor voltages tend to be low (2.7V or 3.0V), there might be a cost and complexity trade-off between the number of cells in series vs. desired output voltage. If both the first and second electrical power busses 102, 104 are used equally, the ideal ultracapacitor stack voltage is the average between the nominal voltages of the first and second electrical power busses 102, 104. However, this may not be practical in application. For example, when considering a 12V first electrical power bus 102 and a 48V second electrical power bus 104, the ideal ultracapacitor stack would be $(12+48)/2=30$ Volts, a stack of at least 10 ultracapacitor cells. This would require a cost/benefit calculation and an analysis of mechanical packaging space.

The amount of energy can be computed with the capacitor equation $J=1/2CV^2$ where C is the total capacitance of the capacitor stack and V is the nominal float voltage of the ultracapacitor stack. The stack can easily be sized by adjusting the capacitance of the cells or adding/subtracting series cells.

Figure 5:
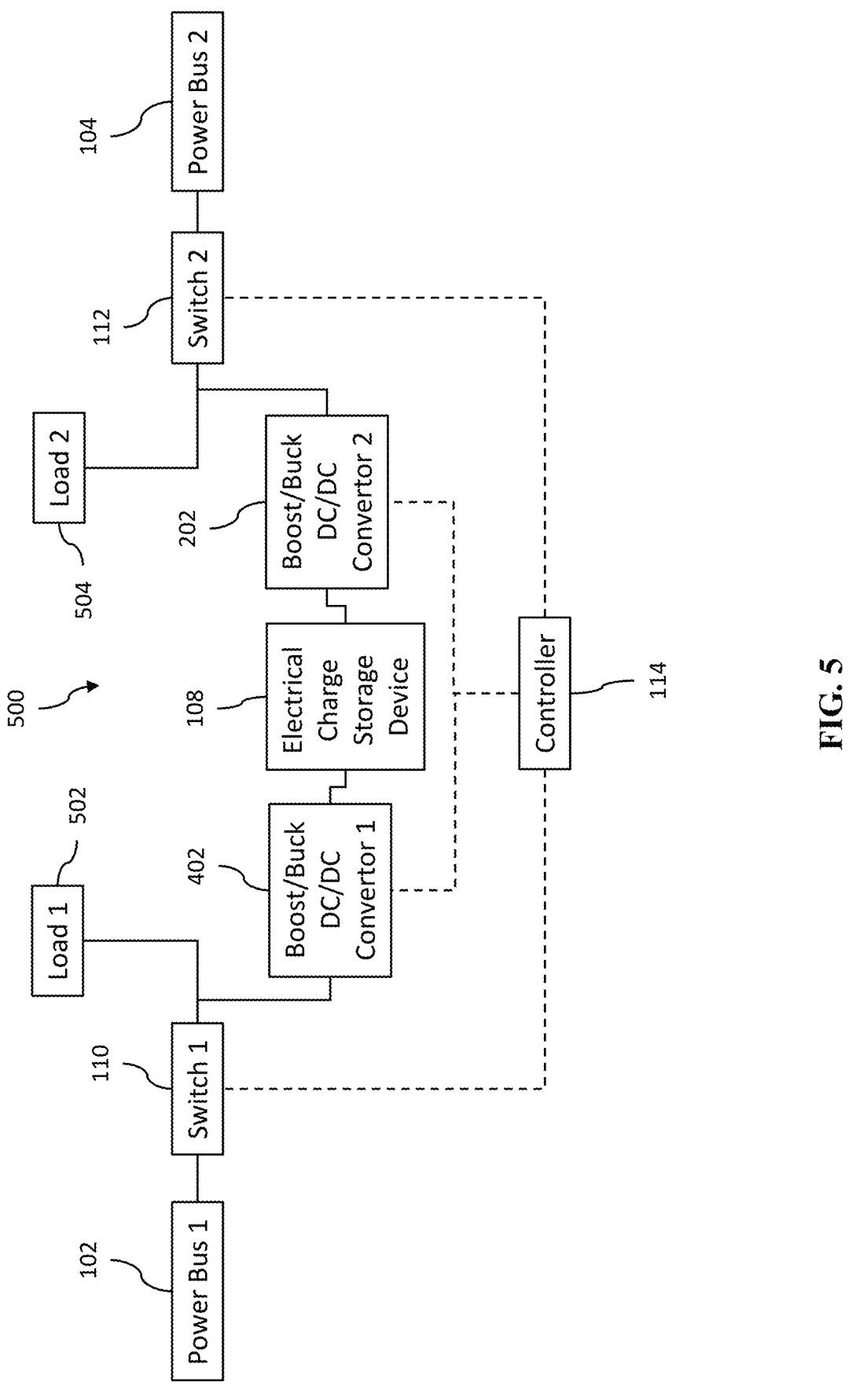
FIG. 5 is a schematic block diagram of another electrical power supply including two boost/buck converters configured to supply back-up power to two separate electrical loads according to some embodiments.

FIG. 5 shows yet another system based on the system 500 which is similar to system 400. In system 500 first and second electrical loads 502, 504 are connected directly to the first and second boost/buck converters 202, 402 before the first and second switches 110, 112 rather than after the first and second switches 110, 112 as implied in the previous systems 100-400. System 500 can provide electrical power to two different electrical loads 502, 504 operating at different voltages from a single electrical charge storage medium 108, thereby reducing system costs. System 500 can also provide electrical power to the two different electrical loads 502, 504 regardless of the state of the first and second switches 110, 112. System 500 can further provide electrical power to the two different electrical loads 502, 504 even if there is an electrical fault on either the first and/or second electrical power busses 102, 104.

It is observed that an ultracapacitor stack has an extremely low or zero FIT rate shorted or open and the near 100% failure is slow degradation of capacitance and slow increase of ESR. This allows the delivery of ASIL power to several electrical loads or load banks with an ultracapacitor stack as the electrical energy storage medium.

The first and second buck/boost converters 202, 402 could be single converters or dual interleaved converters for redundancy.

In addition, the system 500 can prioritize one electrical load over the other. For example, the electrical load 502 is rated as QM and the electrical load 504 is rated as ASIL, the system 500 could give preference to electrical load 504 since it is more safety critical. As used herein, electrical load could mean a single electrical load or a plurality of individual; electrical loads.

While the examples presented herein are directed to automotive applications, other embodiments of these systems 100-500 may be used in wind or solar electrical power generation systems, battery packs wherein some batteries have dissimilar chemistry, or medical devices.

Discussion of Possible Embodiments

The following are non-exclusive descriptions of possible embodiments of the present invention.

In some aspects, the techniques described herein relate to a system configured to supply to a plurality of electrical power buses and receive electrical power from the plurality of electrical power buses, the system including: an electrical charge storage medium; a first switch configured to selectively connect the electrical charge storage medium to a first electrical power bus of the plurality of electrical power buses; and a second switch configured to selectively connect the electrical charge storage medium to a second electrical power bus of the plurality of electrical power buses distinct from the first electrical power bus, the first and second switches configured to be in electronic communication with an electronic controller configured to control operation of the first and second switches.

The system of the preceding paragraph can optionally include, additionally and/or alternatively any, one or more of the following features/steps, configurations and/or additional components.

In some aspects, the techniques described herein relate to a system, wherein the electrical charge storage medium includes an ultracapacitor.

In some aspects, the techniques described herein relate to a system, further including a DC/DC converter configured to exchange electrical power between the electrical charge storage medium and the second electrical power bus.

In some aspects, the techniques described herein relate to a system, wherein the first electrical power bus operates at a different voltage than the second electrical power bus.

In some aspects, the techniques described herein relate to a system, wherein the DC/DC converter includes a first boost/buck converter configured to be in electronic communication with the electronic controller which is further configured to control operation of the first boost/buck converter.

In some aspects, the techniques described herein relate to a system, wherein the boost/buck converter includes a voltage sensor and a current sensor configured to be in communication with the electronic controller.

In some aspects, the techniques described herein relate to a system, wherein the system further includes a second boost/buck converter connected to the electrical charge storage medium and the first switch, wherein the second boost/buck converter is configured to exchange electrical power between the electrical charge storage medium and first electrical power bus, wherein the second boost/buck converter is configured to be in electronic communication with the electronic controller which is further configured to control operation of the second boost/buck converter.

In some aspects, the techniques described herein relate to a system, wherein the first boost/buck converter is configured to power a first electrical load on a third electrical power bus isolatable from the first electrical power bus by the first switch and the second boost/buck converter is configured to power a second electrical load on a third electrical power bus isolatable from the second electrical power bus by the second switch.

In some aspects, the techniques described herein relate to a system, wherein the system further includes the electronic controller.

In some aspects, the techniques described herein relate to a system, wherein the electrical charge storage medium includes a voltage sensor configured to determine a voltage of the electrical charge storage medium and wherein the voltage sensor is configured to be in communication with the electronic controller.

In some aspects, the techniques described herein relate to an electronic controller configured to control a system having an electrical charge storage medium interconnected with a boost/buck converter, a first switch configured to selectively connect the electrical charge storage medium to a first electrical power bus, and a second switch configured to selectively connect the boost/buck converter to a second electrical power bus distinct from the first electrical power bus, the electronic controller including: a computer readable medium storing instructions that, when executed by the electronic controller, cause the electronic controller to: turn off the first switch, turn on the second switch, and operate the boost/buck converter to provide electrical power from the second electrical power bus to the electrical charge storage medium.

The electronic controller of the preceding paragraph can optionally include, additionally and/or alternatively any, one or more of the following features/steps, configurations and/or additional components.

In some aspects, the techniques described herein relate to an electronic controller, wherein the computer readable medium stores instructions that, when executed by the electronic controller, cause the electronic controller to turn on the first switch when the electrical charge storage medium achieves a predetermined voltage.

In some aspects, the techniques described herein relate to an electronic controller, wherein the computer readable medium stores instructions that, when executed by the electronic controller, cause the electronic controller to: determine an initial voltage of the electrical charge storage medium after turning off the first switch and before turning on the second switch, determine a value of the electrical power delivered to the electrical charge storage medium by the boost/buck converter, and determine a storage capacity of the electrical charge storage medium based on the value of the electrical power delivered to the electrical charge storage medium by the boost/buck converter, a time period during which the electrical power delivered to the electrical charge storage medium by the boost/buck converter, and a voltage difference between the initial voltage and a predetermined voltage.

In some aspects, the techniques described herein relate to an electronic controller, wherein the computer readable medium stores instructions that, when executed by the electronic controller, cause the electronic controller to: generate a power pulse to the electrical charge storage medium from the boost/buck converter, and determine an impedance of the electrical charge storage medium based on a change of voltage of the electrical charge storage medium in response to the power pulse.

In some aspects, the techniques described herein relate to an electronic controller, wherein the electronic controller includes a computer readable medium storing instructions that, when executed by the electronic controller, cause the electronic controller to: turn on the first switch, turn on the second switch, operate the boost/buck converter in buck mode to provide electrical power to the electrical charge storage medium, and operate the boost/buck converter in boost mode to provide electrical power from the electrical charge storage medium.

In some aspects, the techniques described herein relate to an electronic controller, wherein the electronic controller includes a computer readable medium storing instructions that, when executed by the electronic controller, cause the electronic controller to: turn on the first switch, turn on the second switch, and operate the boost/buck converter in buck mode to provide electrical power from the second electrical power bus to the first electrical power bus.

In some aspects, the techniques described herein relate to an electronic controller, wherein the electronic controller includes a computer readable medium storing instructions that, when executed by the electronic controller, cause the electronic controller to: turn on the first switch, turn on the second switch, and operate the boost/buck converter in boost mode to provide electrical power from the first electrical power bus to the second electrical power bus.

In some aspects, the techniques described herein relate to an electronic controller, wherein the electronic controller includes a computer readable medium storing instructions that, when executed by the electronic controller, cause the electronic controller to: turn off the first switch, turn on the second switch, and operate the boost/buck converter in boost mode to provide electrical power from the electrical charge storage medium.

In some aspects, the techniques described herein relate to an electronic controller, wherein the electronic controller includes a computer readable medium storing instructions that, when executed by the electronic controller, cause the electronic controller to: turn on the first switch, turn off the second switch; and turn off the first switch when the electrical charge storage medium has attained a predetermined voltage.

In some aspects, the techniques described herein relate to an electronic controller, wherein the electronic controller includes a computer readable medium storing instructions that, when executed by the electronic controller, cause the electronic controller to: turn on the first switch, turn off the second switch; and determine a voltage of the electrical charge storage medium.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. A system configured to supply to a plurality of electrical power buses and receive electrical power from the plurality of electrical power buses, the system comprising:

an electrical charge storage medium;

a first switch configured to selectively connect the electrical charge storage medium to a first electrical power bus of the plurality of electrical power buses; and a second switch configured to selectively connect the electrical charge storage medium to a second electrical power bus of the plurality of electrical power buses distinct from the first electrical power bus, the first and second switches configured to be in electronic communication with an electronic controller configured to control operation of the first and second switches; and a DC/DC converter configured to exchange electrical power between the electrical charge storage medium and the second electrical power bus, the DC/DC converter comprises a first boost/buck converter configured to be in electronic communication with the electronic controller which is further configured to control operation of the first boost/buck converter, the DC/DC converter further comprises a second boost/buck converter connected to the electrical charge storage medium and the first switch, wherein the second boost/buck converter is configured to exchange electrical power between the electrical charge storage medium and first electrical power bus, wherein the second boost/buck converter is configured to be in electronic communication with the electronic controller which is further configured to control operation of the second boost/buck converter.

2. The system in accordance with claim 1, wherein the electrical charge storage medium comprises an ultracapacitor.

3. The system in accordance with claim 1, wherein the first electrical power bus operates at a different voltage than the second electrical power bus.

4. The system in accordance with claim 1, wherein the boost/buck converter comprises a voltage sensor and a current sensor configured to be in communication with the electronic controller.

5. The system in accordance with claim 1, wherein the first boost/buck converter is configured to power a first electrical load on a third electrical power bus isolatable from the first electrical power bus by the first switch and the second boost/buck converter is configured to power a second electrical load on a third electrical power bus isolatable from the second electrical power bus by the second switch.

6. The system in accordance with claim 1, wherein the system further comprises the electronic controller.

7. The system in accordance with claim 1, wherein the electrical charge storage medium comprises a voltage sensor configured to determine a voltage of the electrical charge storage medium and wherein the voltage sensor is configured to be in communication with the electronic controller.

8. An electronic controller configured to control a system having an electrical charge storage medium interconnected with a boost/buck converter, a first switch configured to selectively connect the electrical charge storage medium to a first electrical power bus, and a second switch configured to selectively connect the boost/buck converter to a second electrical power bus distinct from the first electrical power bus, the electronic controller comprising:

a computer readable medium storing instructions that, when executed by the electronic controller, cause the electronic controller to:

turn off the first switch, turn on the second switch, operate the boost/buck converter to provide electrical power from the second electrical power bus to the electrical charge storage medium, and operate the boost/buck converter to determine a capacity or impedance of the electrical charge storage medium.

9. The electronic controller in accordance with claim 8, wherein the computer readable medium stores instructions that, when executed by the electronic controller, cause the electronic controller to turn on the first switch when the electrical charge storage medium achieves a predetermined voltage.

10. The electronic controller in accordance with claim 8, wherein the computer readable medium stores instructions that, when executed by the electronic controller, cause the electronic controller to:

determine an initial voltage of the electrical charge storage medium after turning off the first switch and before turning on the second switch, determine a value of the electrical power delivered to the electrical charge storage medium by the boost/buck converter, and determine a storage capacity of the electrical charge storage medium based on the value of the electrical power delivered to the electrical charge storage medium by the boost/buck converter, a time period during which the electrical power delivered to the electrical charge storage medium by the boost/buck converter, and a voltage difference between the initial voltage and a predetermined voltage.

11. The electronic controller in accordance with claim 8, wherein the computer readable medium stores instructions that, when executed by the electronic controller, cause the electronic controller to:

generate a power pulse to the electrical charge storage medium from the boost/buck converter, and determine an impedance of the electrical charge storage medium based on a change of voltage of the electrical charge storage medium in response to the power pulse.

12. The electronic controller in accordance with claim 8, wherein the electronic controller comprises a computer readable medium storing instructions that, when executed by the electronic controller, cause the electronic controller to:

turn on the first switch, turn off the second switch; and determine a voltage of the electrical charge storage medium.

13. An electronic controller configured to control a system having an electrical charge storage medium interconnected with a boost/buck converter, a first switch configured to selectively connect the electrical charge storage medium to a first electrical power bus, and a second switch configured to selectively connect the boost/buck converter to a second electrical power bus distinct from the first electrical power bus, the electronic controller comprising:

a computer readable medium storing instructions that, when executed by the electronic controller, cause the electronic controller to:

turn on the first switch, turn off the second switch; and turn off the first switch when the electrical charge storage medium has attained a predetermined voltage, turn off the first switch, turn on the second switch, and operate the boost/buck converter to provide electrical power from the second electrical power bus to the electrical charge storage medium.

14. An electronic controller configured to control a system having an electrical charge storage medium interconnected with a boost/buck converter, a first switch configured to selectively connect the electrical charge storage medium to a first electrical power bus, and a second switch configured to selectively connect the boost/buck converter to a second electrical power bus distinct from the first electrical power bus, the electronic controller comprising:

a computer readable medium storing instructions that, when executed by the electronic controller, cause the electronic controller to:

turn off the first switch, turn on the second switch, and operate the boost/buck converter to provide electrical power from the second electrical power bus to and from the electrical charge storage medium while the second switch is on.

15. The electronic controller in accordance with claim 14, wherein the electronic controller comprises a computer readable medium storing instructions that, when executed by the electronic controller, cause the electronic controller to:

turn on the first switch, turn on the second switch, operate the boost/buck converter in buck mode to provide electrical power to the electrical charge storage medium, and operate the boost/buck converter in boost mode to provide electrical power from the electrical charge storage medium.

16. The electronic controller in accordance with claim 14, wherein the electronic controller comprises a computer readable medium storing instructions that, when executed by the electronic controller, cause the electronic controller to:

turn on the first switch, turn on the second switch, and operate the boost/buck converter in buck mode to provide electrical power from the second electrical power bus to the first electrical power bus.

17. The electronic controller in accordance with claim 14, wherein the electronic controller comprises a computer readable medium storing instructions that, when executed by the electronic controller, cause the electronic controller to:

turn on the first switch, turn on the second switch, and operate the boost/buck converter in boost mode to provide electrical power from the first electrical power bus to the second electrical power bus.

18. The electronic controller in accordance with claim 14, wherein the electronic controller comprises a computer readable medium storing instructions that, when executed by the electronic controller, cause the electronic controller to:

turn off the first switch, turn on the second switch, and operate the boost/buck converter in boost mode to provide electrical power from the electrical charge storage medium.

\* \* \* \* \*